United States Patent [19]

Griffith

[11] 4,332,450
[45] Jun. 1, 1982

[54] MAGNETIC ACTUATION METHODS AND APPARATUS

[75] Inventor: Gerald W. Griffith, Tustin, Calif.

[73] Assignee: James Dole Corporation, Fountain Valley, Calif.

[21] Appl. No.: 187,272

[22] Filed: Sep. 15, 1980

[51] Int. Cl.³ .......................... G03B 9/10; H01F 7/14
[52] U.S. Cl. .................................. 354/234; 335/234; 350/269; 354/250
[58] Field of Search ............... 354/234, 235, 250, 258; 350/269; 335/79, 81, 181, 230, 234, 219

[56] References Cited

U.S. PATENT DOCUMENTS

| | | |
|---|---|---|
| 1,552,676 | 9/1925 | Carpenter et al. . |
| 1,792,318 | 2/1931 | O'Meara et al. . |
| 2,872,546 | 2/1959 | Babcock . |
| 3,156,798 | 11/1964 | Rights . |
| 3,609,608 | 9/1971 | Pokorny . |
| 3,745,495 | 7/1973 | Chai et al. . |
| 3,784,291 | 1/1974 | Hirata et al. ............... 354/258 X |
| 4,088,405 | 5/1978 | Pustka et al. .............. 354/234 X |

*Primary Examiner*—John Gonzales
*Attorney, Agent, or Firm*—Benoit Law Corporation

[57] ABSTRACT

Magnetic actuation methods and apparatus provide in an air gap a first magnetic field and a magnet having a second magnetic field at an angle to and interacting with the first magnetic field. A pivot axis for the magnet is located laterally and entirely outside of the air gap, and such magnet is displaced in the air gap with the interacting first and second magnetic fields about the laterally located pivot axis. In practice, the air gap may be provided by a pair of pole pieces and the magnet may be located on a lever extending past the air gap. Such lever may be pivoted about an axis extending through one of the pole pieces. The lever is then displaced with the magnet and the magnetic field in the air gap.

31 Claims, 4 Drawing Figures

MAGNETIC ACTUATION METHODS AND APPARATUS

BACKGROUND OF THE INVENTION

1. Field of the Invention

The subject invention relates to magnetic actuation methods and apparatus, to magnetic actuators, and to optical apparatus, including optical shutters.

2. Disclosure Statement

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Despite its old age, the art of magnetic actuators has not been able to satisfy certain needs by conventional means. Reference may in this respect be had to U.S. Pat. No. 1,552,676, by R. E. H. Carpenter et al., issued Sept. 8, 1925 and U.S. Pat. No. 2,872,546, by S. K. Babcock, issued Feb. 3, 1959. These two expired patents show magnetic actuators or relays having a movable armature pivoted between opposite pole pieces. In practice, those proposals entailed considerable effort in the design and provision of the requisite pivot structure and made for a relatively complex and generally impractical construction, aggravated by the need of a cumbersome and time-consuming assembly procedure.

More or less related developments offered no alleviating solution, as may be seen from U.S. Pat. No. 1,792,318, by T. J. O'Meara et al., issued Feb. 10, 1931, and showing an electromagnetic apparatus of the railway signaling type, U.S. Pat. No. 3,156,798, by H. T. Rights, issued Nov. 10, 1964 and showing resonant frequency reed relays, U.S. Pat. No. 3,609,608, by F. J. Pokorny, issued Sept. 28, 1971 and showing a magnetic latch for circuit interruptors, and U.S. Pat. No. 3,745,495, by H. D. Chay et al., issued July 10, 1973, and showing a magnetic actuator comprising a core structure having two distinct magnetic flux paths including a movable armature.

In the area of electromagnetically actuated optical shutters, solenoids have been employed to release manually cocked shutters or to open a shutter closed by springs. In the former case, the need for manual operation presents an inconvenience. In the latter case, a large moving mass is present, together with a relatively complex leverage mechanism.

In the advertising display art, oppositely poled, pivoted magnets have been employed at a distance from an electromagnet in order to flip over a sign or sign element at will. That arrangement would, however, not be suitable for positive actuation purposes and would not develop sufficient power for high-speed actuation.

SUMMARY OF THE INVENTION

It is a general object of this invention to overcome the disadvantages and meet the needs expressed or implicit in the above disclosure statement or in other parts hereof.

It is a related object of this invention to provide improved magnetic actuation methods and actuators, especially of the electromagnetic type.

It is a germane object of this invention to simplify the construction and required assembly of magnetic actuators.

It is also an object of this invention to provide improved optical shutters and shutter actuating methods and mechanisms.

Other objects of the invention will become apparent in the further course of this disclosure.

From a first aspect thereof, the subject invention resides in magnetic actuation methods and actuators and, more specifically, resides in the improvement comprising, in combination, the steps of or means for providing a first magnetic field in an air gap, providing in such air gap a magnet having a second magnetic field at an angle to and interacting with the first magnetic field, locating a pivot axis for the magnet laterally and entirely outside of the air gap, distorting said air gap at a boundary thereof for imposing a unidirectional retention force on said magnet and displacing with the interacting first and second magnetic fields the magnet in the air gap about the laterally located pivot axis.

From another aspect thereof, the subject invention resides in a magnetic actuation method and magnetic actuator and, more specifically, resides in the improvement comprising, in combination, steps or means for providing a pair of pole pieces having an air gap therebetween, providing a lever extending past such air gap, pivoting the lever about a pivot axis extending through one of the pole pieces, placing a magnet in the air gap, attaching the magnet to the lever, providing a magnetic field between the pole pieces in the air gap, and displacing the lever with the magnetic field and magnet.

From a related aspect thereof, the subject invention resides in a magnetic actuator comprising, in combination, means for providing a magnetic field in an air gap, including a pair of pole pieces defining such air gap, a lever extending past the air gap, means connected to the lever for pivoting the lever about the pivot axis extending through one of the pole pieces, and a manget located in the air gap and attached to the lever.

BRIEF DESCRIPTION OF THE DRAWINGS

The invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
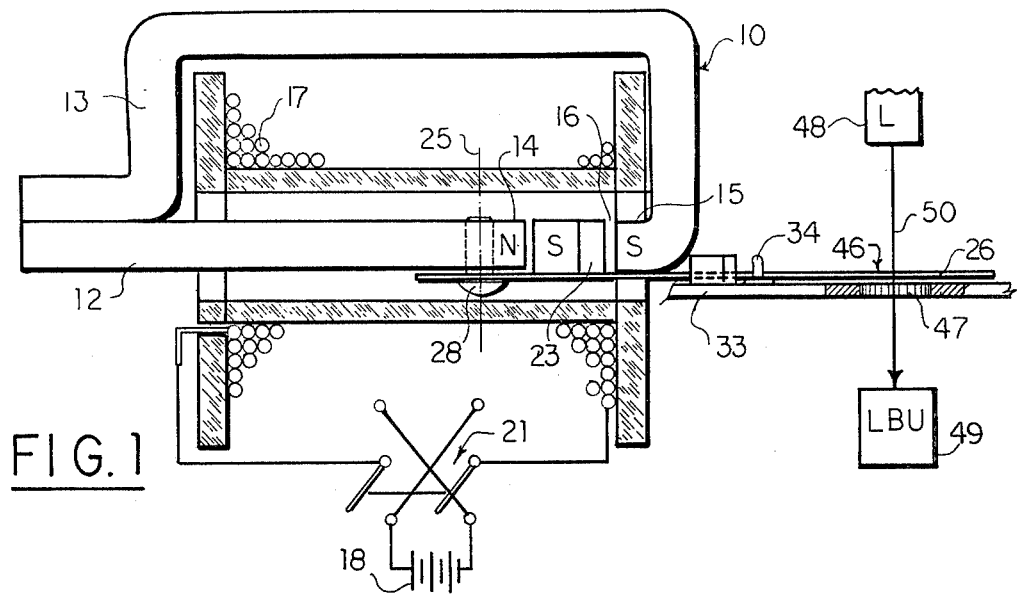
FIG. 1 is a side view, partially in section, of a magnetic actuator according to a preferred embodiment of the subject invention.

The illustrated electromagnetic actuators have a magnetic core or stationary structure 10 composed of two solidly interconnected parts or yokes 12 and 13 of soft magnetic material, defining a pair of pole pieces 14 and 15 having an air gap 16 therebetween. An electromagnetic coil or bobbin 17 upon electrical energization from a source 18 creates a magnetic field in the air gap 16, indicated symbolically by an arrow 19 in FIG. 3. By way of example, the bobbin 17 is located on or about the core member 12 and may extend over the air gap to the core member 13, as seen in FIG. 1.

A polarity reversal switch 21 selectively connects the coil 17 to the source 18. The switch 21 has a neutral position as shown in FIG. 1 in which the coil 17 is disconnected from the electric power source 18. The switch 21 also has an upper position in which the coil is connected to the source at a first polarity, and an alternative lower position in which the coil is energized at an opposite second polarity. At the first polarity, the pole piece 14 acts as a magnetic north pole (N), while the pole piece 15 acts as a south pole (S). Conversely, upon energization at the second polarity, the pole piece 14 acts as a magnetic south pole (S), while the pole piece 15 then acts as a north pole (N).

The illustrated embodiment thus provides a pair of pole pieces 14 and 15 having an air gap 16 therebetween or, more generally, provides a first magnetic field 19 in an air gap 16. The illustrated embodiment also provides in the air gap 16 a magnet 23 having a second magnetic field at an angle to and interacting with the first magnetic field 19. Such second magnetic field is symbolically illustrated in FIG. 3 by an arrow 24 as extending essentially transversely to the first magnetic field 19.

In principle, the magnet 23 could be an electrically energized magnet. Also, while the electromagnetic 17 has been described above as being of a polarity reversal type, the magnetic 23 could be made polarity reversable.

However, the illustrated embodiment of the invention prefers the use of a permanent magnet at 23. Very strong permanent magnet materials are available for this purpose.

The subject invention locates a pivot axis 25 for the magnet 23 laterally and entirely outside of the air gap 16. The subject invention thus radically deviates from conventional proposals which have located the pivot axis for the movable armature on such armature itself, thereby incurring severe design limitations manifesting themselves in a complex and rather awkward construction, calling for a complicated and expensive assembly.

The invention then displaces with the interacting first and second magnetic fields 19 and 24 the magnet 23 in the air gap 16 about the laterally located pivot axis 25.

In accordance with the illustrated preferred embodiment of the invention, the magnet 23 is attached to a movable member or lever 26 which, in turn, is pivoted about the pivot axis 25 located laterally and entirely outside of the air gap 16.

Figure 2:
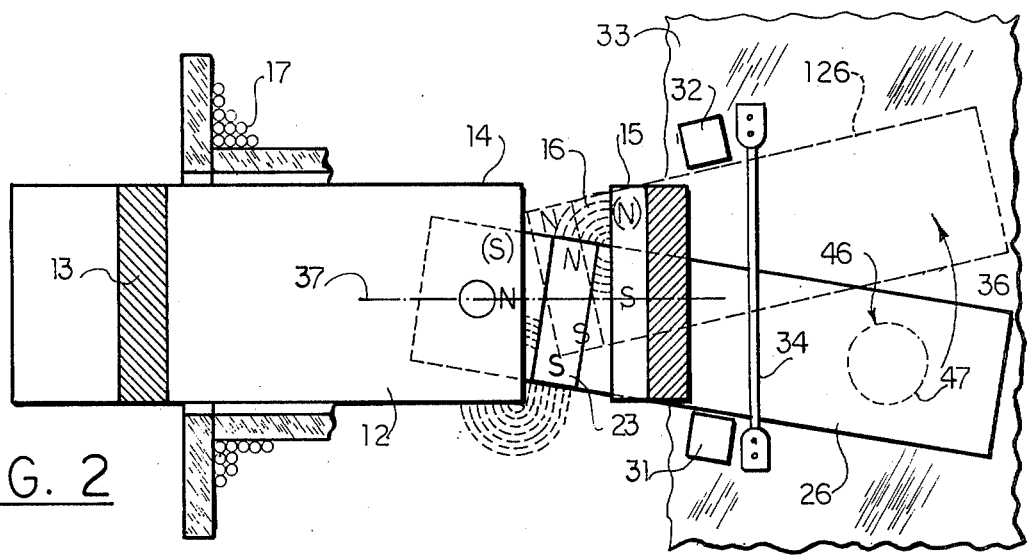
FIG. 2 is a top view, with parts broken away, of the magnetic actuator of FIG. 1.
Figure 4:
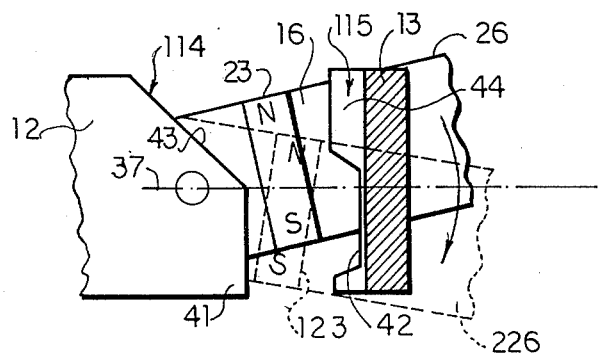
FIG. 4 is a detailed view of a modification of the actuator of FIGS. 1 and 2 according to a further embodiment of the subject invention.

Viewed differently, the illustrated preferred embodiment provides a pair of pole pieces 14 and 15 having an air gap 16 therebetween, and further provides a lever 26 extending past such air gap, and pivots that lever about a pivot axis 25 extending through one of the pole pieces, such as the pole piece 14, as shown in FIGS. 1, 2 and 4. The magnet 23 is placed on or attached to the lever 26 and may thus be located within the air gap 16. A magnetic field 19 is provided between the pole pieces in the air gap 16 and the lever 26 is displaced with the magnetic field 19 and magnet 23, such as for angular movement about the pivot axis 25.

The pivoting technique according to a preferred embodiment of the subject invention attaches a pivot 28 for the lever 26 to the one pole piece 14, laterally and entirely outside of the air gap 16. As seen by way of example in FIG. 1, the pivot 28 may include a rivet or other fastener attached to the core 12 at the pole piece 14. A head of the rivet at 28 loosely retains the lever 26 for angular movement relative to the pivot axis 25.

In the embodiment of FIGS. 1 and 2, the magnet 23 or lever 26 is displaced bistably between extreme first and second positions delimited by a pair of stops 31 and 32, which may be located on a base plate 33. The magnet 23, as permanent magnet, enables retention of the lever 26 in either bistable position during intervals between energizations of the bobbin 17. Preferably, the stops are of, or are faced with, foam rubber or another energy absorbent material, in order to avoid bouncing of the lever or blade 26.

Optionally, the base plate 33 may also carry a bail-wire 34 which loosely retains the lever 26 for angular movement, while restraining axial movement in parallel to the pivot axis 25 thereof, as desired or necessary.

Figure 3:
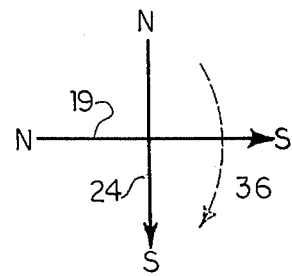
FIG. 3 is a diagram illustrating magnetic flux and torque relationships in the actuator of FIGS. 1 and 2.

The lever 26 will be moved in the direction of an arrow 36 against the stop 31 in response to transverse or crossed magnetic fields 19 and 24 poled as diagrammatically indicated in FIG. 3. Because of the bistable nature of the magnetic actuator 10 shown in FIGS. 1 and 2, the magnet 23 and lever 26 will remain in their solidly illustrated position shown in FIG. 2 upon opening of the switch 21 and deenergization of the electromagnetic coil 17.

Upon closure of the polarity reversal switch 21 in an opposite sense, the direction of the first magnetic field 19 is reversed whereby the magnet 23 will move to its position shown in dotted outline in FIG. 2, thereby moving the lever 26 in the direction of the arrow 36' against the stop 32, as illustrated by phantom lines at 126 in FIG. 2. Upon reopening of the switch 21 and deenergization of the coil 17, the magnet 23 and lever 26 will remain in their upper bistable position 126, until the polarity reversal switch 21 is reclosed in its originally considered position for a realization of magnetic field directions and relationships as diagrammatically illustrated in FIG. 3.

As seen in FIG. 2, the pole pieces 14 and 15 in the embodiment shown therein are formed symmetrically or have a symmetrical configuration relative to a plane 37 extending along the pivot axis 25 on the one hand and between or at right angles to the pole pieces 14 and 15, on the other.

In this manner, the permanent magnet 23 will remain in the position to which it has been last actuated, for a bistable operation of the magnetic actuator.

According to a further embodiment of the subject invention, the magnet 23 and lever 26 are displaced monostably relative to a rest position, such as the position at the one stop 31. To this end, the air gap 16 may be distorted at one or more boundaries thereof, or one or more of the pole pieces 14 and 15 may be distorted to provide an asymmetrical minimum energy configuration, imposing a unidirectional retention force on the magnet 23 and lever 26. One or both of the pole pieces may be formed asymmetrically relative to the plane 37 which extends along the pivot axis 25 and between these pole pieces.

For instance, at least one of the pole pieces may be formed irregularly at the air gap 16. In the embodiment shown in FIG. 4, one of the pole pieces, namely a modified pole piece 114, is formed with a projecting portion 41 while the other of the pole pieces, such as a modified pole piece 115, is formed with a recessed portion 42 opposite the projecting portion 41 at the air gap 16.

As further seen in FIG. 4, the pole piece 14 may be cut off as shown at 43 for the modified pole piece 114, while the modified pole piece 115 may have a projecting portion 44 opposite the recessed portion 43 at the air gap.

In the embodiment of FIG. 4, the magnet 23 and lever 26 will always be pulled to its rest position shown at 123 and 226, respectively, when the energization of the bobbin 17 is removed. If desired, a polarity reversal switch 21 may still be employed in conjunction with the bobbin 13. On the other hand, that bobbin may be energized from the electric power source 18 through an ordinary single-pole switch. In that case, the polarity of the source 18 is chosen so that the first magnetic field 19 extends in a direction opposite to its direction shown in FIG. 3, whereby the magnet 23 and lever 26 will be actuated to their solidly illustrated position shown in FIG. 4, when the energizing switch is closed. When such energizing switch is then reopened, the magnet 23 will seek its minimum energy level relative to the irregular pole pieces 114 and 115, whereby the magnet 23 and lever 26 will be drawn to their rest position shown in dotted or phantom outline in FIG. 4.

The methods and apparatus herein disclosed may be employed for a great variety of tasks, including the actuation of relays, of optical shutters and of other devices. By way of example, the lever 26 may be formed as a shutter blade, whereby an optical shutter 46 is actuated with the displacing magnet 23.

In the embodiment of FIGS. 1 and 2, the base plate 33 has an optical aperture 47 which is selectively obstructed by the lever or blade 26 upon angular displacement thereof. The optical shutter 46 is thus coupled to the magnet 23 for actuation thereby.

As seen in FIG. 2, the base plate 33 positions the optical aperture 47 in a path of the lever or blade 26 for selective obstruction thereby, with the lever 26 being part of the optical shutter itself.

As shown by way of example in FIG. 1, the optical shutter 46 may be positioned between a laser 48 and laser beam utilization device 49, for selectively obstructing a laser beam 50. In practice, the laser 48 may be replaced by another light source or by a lighted scene, while the component 49 may include a light-sensitive element or medium, such as a photographic film positioned in a camera including the shutter 46.

By alternative actuation of the polarity reversal switch 21, the optical aperture 47 may be selectively opened and closed, and the light beam 50 may be selectively obtructed.

In the case of laser beams or other powerful radiation, as well as in the case of photographic work, a monostable operation of the actuator may be preferable, so that in the case of power failures or during rest periods, the shutter 46 is closed. In that case, the pole configuration shown in FIG. 4 or another monostable actuator within the scope of the subject invention would be chosen for automatically closing the optical aperture 47 with the blade 26 when the bobbin 17 is deenergized.

The subject extensive disclosure will render apparent or suggest to those skilled in the art various modifications, variations and logical extensions within the spirit and scope of the invention.

I claim:

1. In a magnetic actuation method, the improvement comprising in combination the steps of:
   providing a first magnetic field in an air gap;
   providing in said air gap a magnet having a second magnetic field at an angle to and interacting with said first magnetic field;
   locating a pivot axis for said magnet laterally and entirely outside of said air gap;
   distorting said air gap at a boundary thereof for imposing a unidirectional retention force on said magnet; and
   displacing with said interacting first and second magnetic fields said magnet in said air gap about said laterally located pivot axis.

2. A method as claimed in claim 1, including the step of:
   actuating an optical shutter with said displacing magnet.

3. A method as claimed in claim 1, wherein:
   said magnet is attached to a lever; and
   said lever is pivoted about said pivot axis located laterally and entirely outside of said air gap.

4. A method as claimed in claim 3, wherein:
   said lever is angularly displaced with said attached magnet.

5. A method as claimed in claim 4, wherein:
   an optical aperture is selectively obstructed by said lever upon angular displacement thereof.

6. In a magnetic actuation method, the improvement comprising in combination the steps of:
   providing a pair of pole pieces having an air gap therebetween;
   providing a lever extending past said air gap;
   pivoting said lever about a pivot axis extending through one of said pole pieces;
   placing a magnet in said air gap;
   attaching said magnet to said lever;
   providing a magnetic field between said pole pieces in said air gap; and
   displacing said lever with said magnetic field and magnet.

7. A method as claimed in claim 6, wherein:
   said pivoting includes attaching a pivot for said lever to said one pole piece laterally and entirely outside of said air gap.

8. A method as claimed in claim 6, wherein:
   said lever is displaced bistably between extreme first and second positions.

9. A method as claimed in claim 6, wherein:
   said pole pieces are formed symmetrically relative to a plane extending along said pivot axis and between said pole pieces.

10. A method as claimed in claim 6, wherein:
    said lever is displaced monostably relative to a rest position.

11. A method as claimed in claim 6, wherein:
    at least one of said pole pieces is distorted for imposing a unidirectional retention force on said magnet.

12. A method as claimed in claim 6, wherein:
    said pole pieces are formed asymmetrically relative to a plane extending along said pivot axis and between said pole pieces.

13. A method as claimed in claim 6, wherein:

at least one of said pole pieces is formed irregularly at said air gap.

14. A method as claimed in claim 6, wherein:
one of said pole pieces is formed with a recessed portion at said air gap.

15. A method as claimed in claim 6, wherein:
one of said pole pieces is formed with a projecting portion; and
the other of said pole pieces is formed with a recessed portion opposite said projecting portion.

16. A method as claimed in claim 6, 7, 8 10 or 15, wherein:
an optical shutter is actuated with said displacing lever.

17. In a magnetic actuator, the improvement comprising in combination:
means for providing a first magnetic field in an air gap;
a magnet in said air gap having a second magnetic field at an angle to and interacting with said first magnetic field;
means for locating a pivot axis for said magnet laterally and entirely outside of said air gap;
means for distorting said air gap at a boundary thereof for imposing a unidirectional retention force on said magnet; and
means connected to said magnet and to said pivot axis locating means for displacing with said interacting first and second magnetic fields said magnet in said air gap about said laterally located pivot axis.

18. An actuator as claimed in claim 17, including:
an optical shutter coupled to said magnet for actuation thereby.

19. An actuator as claimed in claim 17, wherein:
said displacing means include a lever carrying said magnet and pivoted about said laterally located pivot axis.

20. An actuator as claimed in claim 19, including:
means for positioning an optical aperture in a path of said lever for selective obstruction thereby.

21. In a magnetic actuator, the improvement comprising in combination:
means for providing a magnetic field in an air gap, including a pair of pole pieces defining said air gap;
a lever extending past said air gap;
means connected to said lever for pivoting said lever about a pivot axis extending through one of said pole pieces; and
a magnet located in said air gap and attached to said lever.

22. An actuator as claimed in claim 21, wherein:
said pivoting means include a pivot attached to said one pole piece laterally and entirely outside of said air gap.

23. An actuator as claimed in claim 21, including:
means for displacing said lever bistably between extreme first and second positions.

24. An actuator as claimed in claim 21, wherein:
said pole pieces have a symmetrical configuration relative to a plane extending along said pivot axis and between said pole pieces.

25. An actuator as claimed in claim 21, including:
means for displacing said lever monostably relative to a rest position.

26. An actuator as claimed in claim 21, including:
means for imposing a unidirectional retention force on said magnet.

27. An actuator as claimed in claim 21, wherein:
said pole pieces have an asymmetrical configuration relative to a plane extending along said pivot axis and between said pole pieces.

28. An actuator as claimed in claim 21, wherein:
one of said pole pieces has an irregular configuration at said air gap.

29. An actuator as claimed in claim 21, wherein:
one of said pole pieces has a recessed portion at said air gap.

30. An actuator as claimed in claim 21, wherein:
one of said pole pieces has a projecting portion; and
the other of said pole pieces has a recessed portion opposite said projecting portion.

31. An actuator as claimed in claim 21, 22, 23, 25 or 30, wherein:
said lever is part of an optical shutter.

* * * * *